United States Patent
Rabb et al.

(10) Patent No.: US 10,488,292 B1
(45) Date of Patent: Nov. 26, 2019

(54) LEAK DETECTION SYSTEM

(71) Applicant: LEAK DETECTION TECHNOLOGIES, INC., Tucson, AZ (US)

(72) Inventors: David M. Rabb, Tucson, AZ (US); Kenneth H. Huey, Tucson, AZ (US)

(73) Assignee: LEAK DETECTION TECHNOLOGIES, INC., Tucson, AZ (US)

( * ) Notice: Subject to any disclaimer, the term of this patent is extended or adjusted under 35 U.S.C. 154(b) by 162 days.

(21) Appl. No.: 14/884,621

(22) Filed: Oct. 15, 2015

Related U.S. Application Data

(60) Provisional application No. 62/064,727, filed on Oct. 16, 2014.

(51) Int. Cl.
*G01M 3/14* (2006.01)
*G01M 3/10* (2006.01)
*G01M 3/12* (2006.01)

(52) U.S. Cl.
CPC .............. *G01M 3/146* (2013.01); *G01M 3/10* (2013.01); *G01M 3/12* (2013.01)

(58) Field of Classification Search
CPC ........... G01M 3/12; G01M 3/14; G01M 3/146
USPC ................................. 73/49.2, 49.3
See application file for complete search history.

(56) References Cited

U.S. PATENT DOCUMENTS

| | | | |
|---|---|---|---|
| 3,247,375 A | 4/1966 | Lovelock | 250/43.5 |
| 3,361,908 A | 1/1968 | Petitjean et al. | 250/43.5 |
| 3,518,059 A | 6/1970 | Levy | 23/232 |
| 3,714,421 A | 1/1973 | Josias et al. | 250/43.5 |
| 4,063,156 A | 12/1977 | Patterson | 324/33 |
| 4,141,692 A | 2/1979 | Keller | 44/59 |
| 4,156,813 A | 5/1979 | Flanagan et al. | 250/381 |
| 4,173,141 A | 11/1979 | Kissell et al. | 73/40.7 |
| 4,328,700 A | 5/1982 | Fries | 73/40.7 |
| 4,551,154 A | 11/1985 | Malcosky et al. | 48/193 |

(Continued)

FOREIGN PATENT DOCUMENTS

| | | | | |
|---|---|---|---|---|
| CA | 2714125 | 2/2012 | | G01M 3/04 |
| WO | WO2008137279 | 11/2008 | | G01M 3/22 |

OTHER PUBLICATIONS

"Image of garden sprayer for bubble detection fluids". Nondestructive Testing Handbook, vol. 1 (Leak Testing), 2nd Edition, American Society for Nondestructive Testing, Inc., 1982, p. 420.*

(Continued)

*Primary Examiner* — Nathaniel J Kolb
(74) *Attorney, Agent, or Firm* — Hayes Soloway P.C.

(57) ABSTRACT

Described is an apparatus and method for detecting leaks in a storage tank or containment of the type having a removable cover. The apparatus includes a replacement cover for the containment, a vacuum source, a fitting mounted in an aperture in the replacement cover and connected through a valve through a vacuum source, and a sprayer wand for spraying soapy liquid onto interior walls of the tank. Also provided is a method for detecting leaks in a storage tank or containment including the steps of emptying the tank of its contents, cleaning interior walls of the tank, spraying a soapy water liquid onto interior walls of the tank, reducing pressure within the tank, and examining the interior walls of the tank for bubbles.

13 Claims, 3 Drawing Sheets

(56) References Cited

U.S. PATENT DOCUMENTS

| | | | |
|---|---|---|---|
| 4,593,530 A | 6/1986 | Longsworth | 62/55.5 |
| 4,676,261 A * | 6/1987 | Blaul | B08B 15/026 134/104.4 |
| 4,690,689 A | 9/1987 | Malcosky et al. | 48/174 |
| 4,709,577 A | 12/1987 | Thompson | 73/40.7 |
| 4,725,551 A | 2/1988 | Thompson | 436/3 |
| 4,748,847 A | 6/1988 | Sheahan | 73/40.7 |
| 4,773,255 A | 9/1988 | Malcosky et al. | 73/40.7 |
| 4,806,314 A | 2/1989 | Fertig et al. | 422/78 |
| 4,819,477 A | 4/1989 | Fisher et al. | 422/78 |
| 4,896,528 A | 1/1990 | Lewis | 73/40.7 |
| 5,012,052 A | 4/1991 | Hayes | 250/288 |
| 5,046,353 A | 9/1991 | Thompson | 73/40.7 |
| 5,048,324 A | 9/1991 | Thompson | 73/40.7 |
| 5,070,723 A | 12/1991 | Tsou et al. | 73/40.7 |
| 5,076,728 A | 12/1991 | Golding | 405/128 |
| 5,092,155 A | 3/1992 | Rounbehler et al. | 73/1 |
| 5,111,882 A | 5/1992 | Tang et al. | 166/252 |
| 5,320,967 A | 6/1994 | Avallone et al. | 436/50 |
| 5,388,446 A | 2/1995 | Kronberg | 73/40.7 |
| 5,409,839 A | 4/1995 | Balestrieri et al. | 436/56 |
| 5,428,988 A | 7/1995 | Starkovich | 73/40 |
| 5,447,055 A | 9/1995 | Thompson et al. | 73/49.2 |
| 5,620,157 A * | 4/1997 | Titzer | B60S 3/047 239/750 |
| 5,767,390 A | 6/1998 | Chapman, IV | 73/40.7 |
| 5,922,943 A | 7/1999 | Chapman, IV | 73/40.7 |
| 5,939,619 A | 8/1999 | Achter et al. | 73/40.7 |
| 6,003,365 A | 12/1999 | Pope et al. | 73/152.39 |
| 6,025,200 A | 2/2000 | Kaish et al. | 436/56 |
| 6,035,701 A | 3/2000 | Lowry et al. | 73/40.7 |
| 6,116,776 A * | 9/2000 | Bowling | G01M 3/002 374/4 |
| 6,196,056 B1 | 3/2001 | Ewing et al. | 73/40.7 |
| 6,214,624 B1 | 4/2001 | Barker et al. | 436/8 |
| 6,354,141 B1 | 3/2002 | Pierrejean et al. | 73/40.7 |
| 6,460,405 B1 | 10/2002 | Mayer et al. | 73/40.7 |
| 6,564,614 B1 * | 5/2003 | Doris | G01M 3/26 73/49.2 |
| 6,817,227 B2 | 11/2004 | Thompson et al. | 73/40.7 |
| 6,840,086 B2 | 1/2005 | McCoy et al. | 73/40.7 |
| 6,860,141 B2 | 3/2005 | McCoy et al. | 73/40.7 |
| 6,871,556 B2 | 3/2005 | Andresen et al. | 73/863.21 |
| 6,966,213 B2 | 11/2005 | Hoots et al. | 73/40.7 |
| 7,032,662 B2 | 4/2006 | Malone et al. | 166/252.6 |
| 7,047,830 B2 | 5/2006 | Bratton et al. | 73/865.8 |
| 7,083,742 B1 | 8/2006 | Nimitz et al. | 252/8 |
| 7,140,232 B2 | 11/2006 | Wright et al. | 73/25.01 |
| 7,178,385 B2 | 2/2007 | McCoy et al. | 73/40.7 |
| 7,197,914 B2 | 4/2007 | Maresca, Jr. et al. | 73/40.7 |
| 7,331,248 B2 | 2/2008 | Maresca, Jr. et al. | 73/865.8 |
| 7,576,319 B2 | 8/2009 | Miller et al. | 250/282 |
| 8,281,642 B2 | 10/2012 | Lee et al. | 73/31.01 |
| 8,302,461 B2 | 11/2012 | Angster et al. | 73/31.04 |
| 8,448,495 B2 | 5/2013 | Breviere et al. | 73/31.05 |
| 8,756,975 B2 | 6/2014 | Wu | 73/31.05 |
| 8,806,919 B2 | 8/2014 | Solomon et al. | 73/40.7 |
| 2003/0082918 A1 | 5/2003 | Hayasaka et al. | 438/706 |
| 2004/0170538 A1 | 9/2004 | Kawakami et al. | 422/128 |
| 2006/0000298 A1 | 1/2006 | Thompson et al. | 73/863.81 |
| 2006/0258008 A1 * | 11/2006 | Holler | G01M 3/12 436/3 |
| 2013/0025349 A1 | 1/2013 | Solomon et al. | 73/40.7 |
| 2017/0184554 A1 | 6/2017 | Ghiasvand et al. | G01N 30/482 |

OTHER PUBLICATIONS

Nelson et al., "Field Study of the Partitioning Tracer Method for Detection of Dense Nonaqueous Phase Liquid in a Trichloroethene-Contaminated Aquifer," Environmental Science & Technology, vol. 30, No. 9, 1996, pp. 2859-2863 (5 pgs).

EPRI, "Condenser Leak Detection by Using $SF_6$ as a Tracer Gas," Technical Brief (undated) (2 pgs).

Notice of Allowance issued in related U.S. Patent Appln. U.S. Appl. No. 15/084,267 dated Nov. 2, 2017, 12 pgs.

* cited by examiner

LEAK DETECTION SYSTEM

CROSS REFERENCE TO RELATED APPLICATIONS

This application claims benefit to U.S. Provisional Application Ser. No. 62/064,727, filed Oct. 16, 2014, the contents of which are incorporated herein.

BACKGROUND OF THE INVENTION

This invention relates generally to a leak detection apparatus and method for the detection and location of leaks in underground or underwater storage containments such as fuel and hazards material storage tanks, under dispenser containment (UDC), vaults, and sumps, and will be described in connection with such utility, although other utilities are contemplated.

It is standard in the oil industry to employ pressure tests, various types of still gauging, or liquid level measurements or to perform measurements of hydrocarbons in the subsurface to determine if a containment is leaking. Each of these conventional methods suffers significant practical shortcomings. Known pressure tests are known to be insensitive and thus are not reliable. The still gauging methods require the tank to be filled with product to a point above ground where changes in liquid level can be observed in a small diameter tube, all the while monitoring for the product temperature to take into account thermal expansion or shrinkage effects. The major drawbacks to this method are inconvenience due to disruption of tank service for about twelve hours and the expense for testing and for the purchase of sufficient product to fill a potentially leaking tank.

Testing for hydrocarbons in the subsurface is known to be highly unreliable due partially to the fact that surface spills create relatively high subsurface product vapor concentrations. Thus vapor detection for leaks seldom is considered as reliable, let alone conclusive.

Once the presence or existence of a leak has been confirmed, none of the know leak detection methods can determine the exact location of the leak. Traditional leak detection methods requires the dangerous time consuming and expensive process of excavating the entire area around the containment. Subsurface soil or soil vapor samples can be taken around the containment to help determine a leak location but old spills and leaks will confuse the operator of the region the leak could possibly be located but even in the best conditions the exact location of the leak cannot be determined.

The foregoing discussion of the prior art derives primarily from U.S. Pat. No. 4,725,551 in which there is described a method and apparatus for detection and location of leaks in subsurface fluid storage tanks by mixing a quantity of a tracer with the fluid in the tank, providing at least one subsurface vapor or air inlet sampling pipe in the backfill or vicinity of the tank, providing at least one positive pressure vapor pipe in the backfill or adjacent vicinity of the tank, and drawing air from the positive pressure pipe which is flowed past the tank into the sampling pipe, and analyzing the air drawn into the sampling pipes for the presence of the tracer, indicating the detection of a leak in the tank.

Other prior art patents describing the various other systems for monitoring for leaks in underground storage tanks include U.S. Pat. Nos. 4,709,577; 4,725,551; 5,046,353 and 5,048,324. All of these prior art systems are cumbersome, and do not provide easy and reliable methods for testing and pinpointing the location of a leak in a tank.

It is an object of the present invention to provide an improved leak detection apparatus and method for use in conjunction with underground and underwater container systems.

It is a further object of the present invention to provide a leak detection apparatus and method for detecting fluid leaks from subsurface and underwater liquid storage tanks.

A still further object of the present invention is to provide an improved leak detection apparatus and method for rapidly locating even small leaks in buried and underwater fuel storage containments and tanks.

Yet another object of the present invention is to provide a leak detection system and apparatus for use in conjunction with underground and underwater liquid storage tanks where a leak is suspected.

Still another object of the present invention is to provide a leak detection method and apparatus to use in conjunction with buried fuel tanks which can be implemented in new or existing service stations without requiring tank removal.

SUMMARY OF THE INVENTION

The present invention, in one aspect, provides a method and apparatus for detection and location of leaks in underground and underwater liquid fuel storage tanks such as fuel tanks and containments, in which the containment is emptied and interior inspected and clean as needed. Thereafter, the tank is sealed, and a vacuum pulled to reduce the interior pressure in the containment. A soap containing liquid is then sprayed on the interior surfaces of the containment, and the entire interior surfaces are visually inspected. Leaks appear as bubbles, pinpointing the location of a leak.

In one embodiment of the invention, a video record is made of essentially 100% of the interior wall area and all components within the containment.

In another and alternative embodiment of the invention, where the tank is an underwater storage tank, the tank walls are inspected and washed and dried as needed, the tank is sealed and a vacuum pulled. The existence and presence of leaks are determined by the appearance of water spots on the interior wall of the tank.

In one embodiment of the invention, the video camera is supported on a robot arm that controls movement of the video camera within the tank.

In another embodiment of the invention, the video camera is connected to a wand which is directed by a technician from outside the tank.

In still yet another embodiment of the invention, a technician may be positioned in the tank to observe the bubbles directly.

In yet another embodiment of the invention, a cover plate provided for temporary installation on the tank in place of the tank cover includes an aperture through which a vacuum is drawn.

In yet another embodiment of the invention reinforced gloves are provided through the cover plate for permitting a technician to manipulate lines and equipment such as a sprayer wand or video camera within the tank.

In yet another embodiment, the system includes a vacuum gauge for measuring the vacuum drawn on the containment.

In yet another embodiment, the system includes a soap reservoir external to the containment connected to a sprayer wand within the tank.

In still yet another embodiment of the invention, support struts are provided within the container to brace the walls and/or top of the tank or containment to prevent collapse when a vacuum is applied to the containment.

BRIEF DESCRIPTION OF THE DRAWINGS

Further features and advantages of the present invention will be seen from the following detailed description, taken in conjunction with the accompanying drawings, wherein.

DETAILED DESCRIPTION

Figure 1:
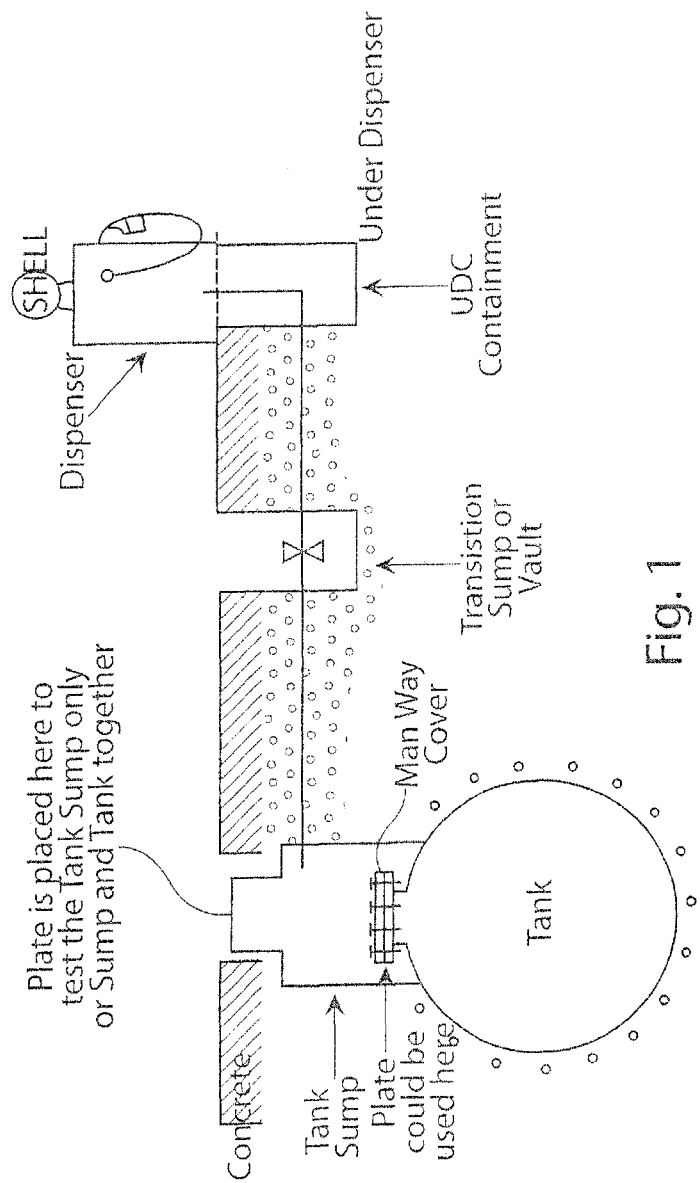
FIG. 1 is a side elevational view, in cross section, of a leak detection system in accordance with the present invention.
Figure 2:
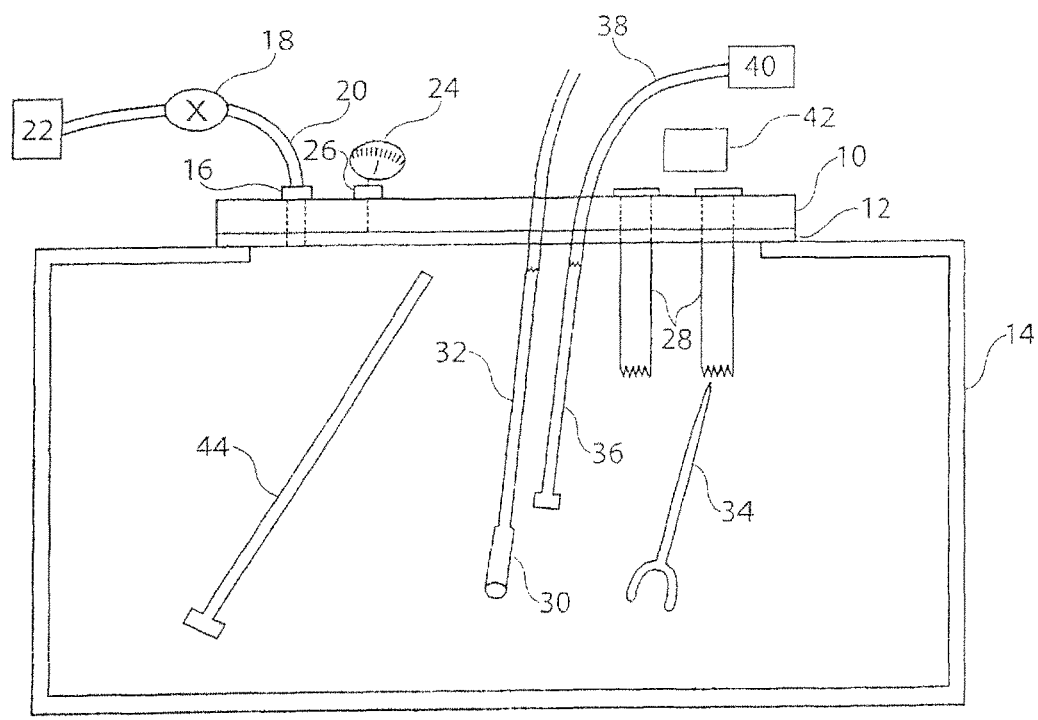
FIG. 2 is a side elevational view, in cross section, showing details of elements of a leak detection system in a containment in accordance with the present invention.
Figure 3:
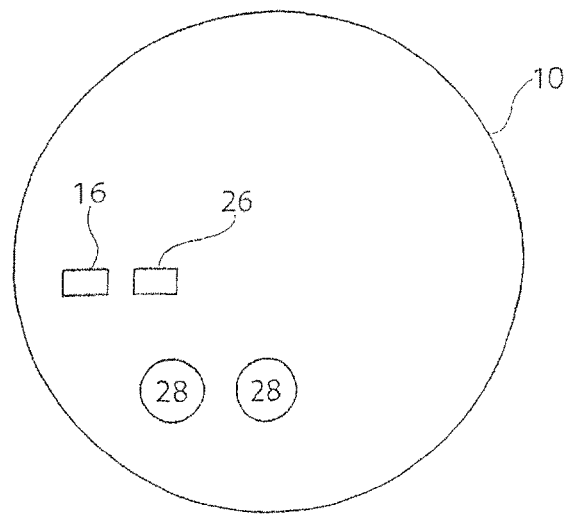
FIG. 3 is a top plan view of the leak detection system in accordance with the present invention.

Referring to FIGS. 1-3 of the drawings, the leak detection system in accordance with the present invention includes a cover plate 10 sized and shaped to fit as a replacement for the cover for a containment 14. Plate 10 should be of sufficient thickness and construction to withstand the structural load created by the vacuum pressure of the test. Typically plate 10 includes a gasket 12 sized and shaped to seal the plate to the containment 14. A fitting 16 mounted through an aperture in plate 10, connects to a valve 18 through a conduit 20, and then to a vacuum source 22. A vacuum gauge 24 is connected to a vacuum gauge fitting 26 which communicates with the inside of the tank 14 when plate 10 is installed thereon.

A pair of reinforced long sleeve gloves 28 are mounted through plate 10 and sealed for permitting a technician to manipulate tools, etc., within the containment, as will be explained below.

Referring in particular to FIG. 2, the tools include a video camera 30 which is mounted on a wand 32, a grabber tool 34 which may be used by the technician to pick up other tools/or manipulate or maneuver wires or hoses, and a soapy water sprayer wand 36 which is connected via a feed line 38 to a soapy water reservoir 40 located on the exterior side of plate 10. Video camera 30/wand 32, grabber tool 34 and sprayer wand 36 may be placed loose in the containment, or hung from the plate 10.

Completing the system is a video monitor 42 which is hard wire or wireless connected to the camera 30.

Optionally, one or more support struts 44 may be provided for supporting the plate 10 and/or walls of the containment, to prevent potential collapse or implosion of the containment when a vacuum is pulled.

Figure 4:
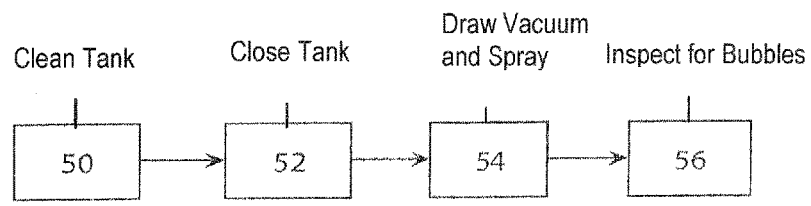
FIG. 4 is a flow diagram illustrating a leak detection process in accordance with one embodiment of the present invention.

Referring to FIG. 4, to test a containment, the containment must be free of liquids and inspected and clean as necessary step 50. Video camera 30/wand 32, grabber tool 34 and sprayer wand 36 are then placed into the containment, and cover plate 10 placed over the containment in place of the conventional cover in a step 52. A vacuum is drawn at step 54. Typically, a vacuum is drawn to 15 to 400 inches of water, preferably 15 to 40 inches of water, most preferably 15 to 30 inches of water. A aqueous soap-containing solution is then sprayed over the entire inside of the containment being tested, and the entire inside of the tank visually inspected for soap bubbles in an inspection step 56. If soap bubbles are observed, note is made as to the location of the soap bubbles for repair of the containment.

Typically the soap solution comprises of surfactant and water, although commercial cleaning solutions can also be used.

Figure 5:
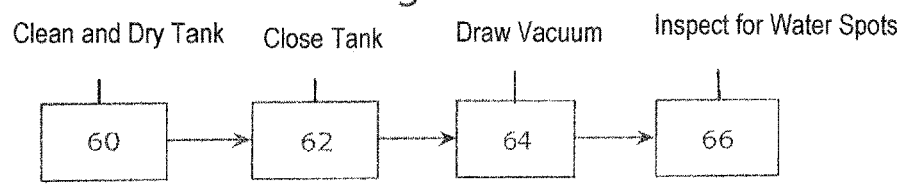
FIG. 5 is a flow diagram similar to FIG. 4, in accordance with an alternative embodiment of the present invention.

Referring to FIG. 5, alternatively, in the case of a tank submerged in water, the process is similar, except soap spray is not necessary. Rather, the tank is inspected and cleaned and dried in a cleaning step 60. Plate 10 is placed thereon in a step 62, and a vacuum drawn in a step 64. After several minutes, the interior walls of the tank is inspected for water spots forming on the interior wall of the tank at an inspection step 66. The presence of water spots on the interior wall indicates the location of a leak. The location of the leak is noted, and the tank may then be repaired at the pinpoint location of the leak.

Various changes may be made without departing from the spirit and scope thereof.

Figure 6:
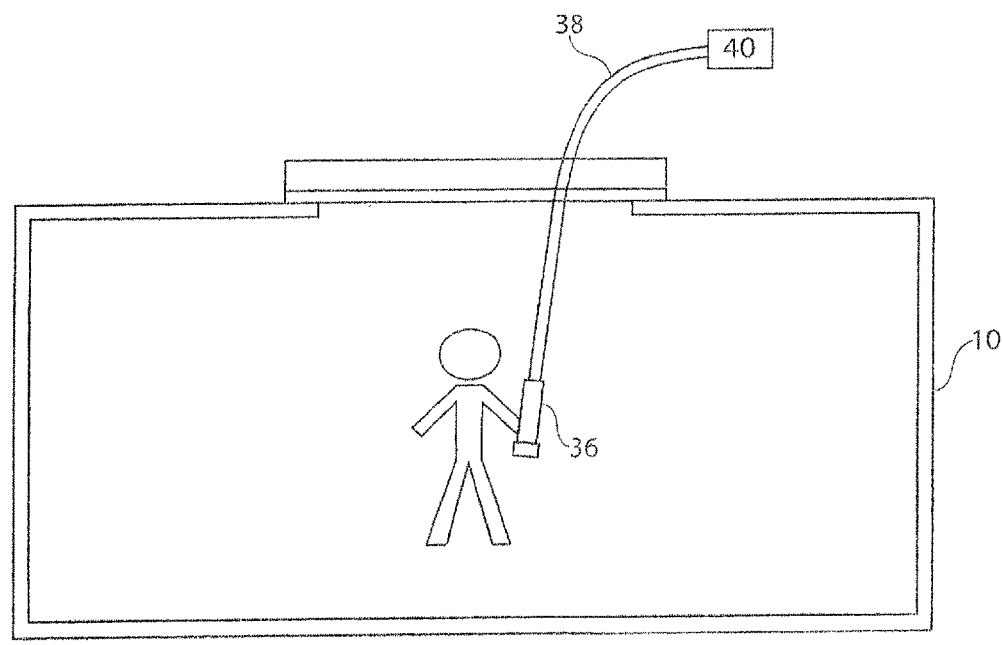
FIG. 6 is a view, similar to FIG. 2, of an alternative embodiment of the invention.

For example, as shown in FIG. 6, for larger containment tanks, it is possible for a technician to climb into the tank and directly observe the walls for signs of leakage. In this regard, the atmospheric conditions within the containment is no different from that of flying in a commercial jetliner. For greater vacuum conditions, the technician may be provided a self-contained breathing apparatus, or the technician may be tethered to an air supply from outside the tank. Also, in the case of higher vacuum applications, the technician may don a life support system similar to a space-suit life support system. Also, in yet another alternative embodiment, the wand 32 and camera 30 may be robot controlled.

The apparatus and method proposed herein offers a vastly more sensitive and faster tracer leak detector system that circumvents substantially all of the shortcomings and problems of the prior art.

There has thus been shown and described a novel apparatus and method for detecting leaks in a buried or submerged containments.

What is claimed is:

1. A kit for simultaneous real-time detecting leaks and their location in a containment-vessel of the type having a removable cover, said system comprising:
   a temporary replacement cover sized and shaped to fit the containment-vessel in place of the removable cover;
   a vacuum source for reducing pressure within an interior of the containment vessel,
   a fitting mounted to a first aperture in the temporary replacement cover and connected through a valve to the vacuum source;
   a sprayer wand configured for spraying a soapy liquid onto interior walls of the containment unit, the sprayer wand having a feed line connected through a second aperture in the temporary replacement cover; and
   a video camera configured for recording images of bubble formation on the interior walls of the containment-vessel and for transmitting said images to a location exterior to the containment vessel, whereupon a presence and location of a leak may simultaneously be determined, in real-time, from images taken by the video camera.

2. The kit according to claim 1, further including a soapy water reservoir configured to be located exterior to the containment vessel, connected to the sprayer wand.

3. The kit of claim 1, further including long sleeve gloves mounted through the temporary replacement cover, configured to permit a person to manipulate objects within the containment vessel from outside the containment vessel.

4. The kit of claim 1, further including one or more support structures configured for supporting the replacement cover and/or walls of the containment vessel to prevent collapse of the containment vessel when a vacuum is pulled.

5. The kit of claim 1, wherein the camera is a robot controlled camera.

6. The kit of claim 1, wherein the sprayer wand is configured to be hangably connected to the temporary replacement cover.

7. A method for simultaneous real-time detecting leaks and their location in a containment vessel, having a removable cover comprising:
removing the removable cover;
emptying the containment vessel of its contents;
cleaning interior walls of the containment vessel;
replacing the removable cover with a temporary replacement cover having a fitting mounted to a first aperture in the temporary replacement cover;
spraying a soapy water liquid onto interior walls of the containment vessel using a sprayer wand having a feed line connected through a second aperture in the temporary replacement cover;
reducing pressure within the containment vessel by drawing a vacuum through the fitting;
using a video camera located within the containment vessel, to examine the interior walls of the containment vessel for bubbles; and
transmitting images taken by the video camera to a location exterior to the containment vessel, whereupon a presence and location of a leak simultaneously may be determined in real-time, from images taken by the video camera, by a presence of bubbles on the interior walls of the containment vessel.

8. The method of claim 7, wherein the temporary replacement cover is placed on the containment vessel and the pressure reduced before the soapy water is applied to the interior walls and components of the containment vessel.

9. The method of claim 7, wherein the pressure within the containment vessel is reduced to between 15-400 inches of water.

10. The method of claim 7, wherein the containment-vessel is a fuel storage vessel.

11. The method of claim 7, wherein the containment vessel is a liquid fuel underground vessel.

12. The method of claim 7, wherein the pressure within the containment vessel is reduced to between 15-30 inches of water.

13. The method of claim 7, wherein the pressure within the containment vessel is reduced to between 20-25 inches of water.

* * * * *